United States Patent
Takayama et al.

(10) Patent No.: US 11,891,509 B2
(45) Date of Patent: Feb. 6, 2024

(54) POLYCARBONATE RESIN COMPOSITION, METHOD FOR PRODUCING THE SAME, MASTERBATCH PELLET, AND MOLDED BODY

(71) Applicants: Ube Material Industries, Ltd., Ube (JP); NATIONAL UNIVERSITY CORPORATION YAMAGATA UNIVERSITY, Yamagata (JP)

(72) Inventors: Tetsuo Takayama, Yonezawa (JP); Yuzo Kato, Ube (JP); Toru Inagaki, Ube (JP)

(73) Assignees: UBE MATERIAL INDUSTRIES, LTD., Ube (JP); NATIONAL UNIVERSITY CORPORATION YAMAGATA UNIVERSITY, Yamagata (JP)

(*) Notice: Subject to any disclaimer, the term of this patent is extended or adjusted under 35 U.S.C. 154(b) by 151 days.

(21) Appl. No.: 17/414,195

(22) PCT Filed: Dec. 25, 2019

(86) PCT No.: PCT/JP2019/050974
§ 371 (c)(1),
(2) Date: Jun. 15, 2021

(87) PCT Pub. No.: WO2020/138222
PCT Pub. Date: Jul. 2, 2020

(65) Prior Publication Data
US 2021/0332237 A1    Oct. 28, 2021

(30) Foreign Application Priority Data

Dec. 27, 2018  (JP) ................ 2018-243931

(51) Int. Cl.
| | |
|---|---|
| *C08L 69/00* | (2006.01) |
| *C08K 3/30* | (2006.01) |
| *C08K 5/098* | (2006.01) |
| *C08K 7/00* | (2006.01) |
| *C08L 23/12* | (2006.01) |
| *C08J 3/22* | (2006.01) |

(52) U.S. Cl.
CPC .............. *C08L 69/00* (2013.01); *C08K 5/098* (2013.01); *C08K 7/00* (2013.01); *C08L 23/12* (2013.01); *C08J 3/226* (2013.01); *C08J 2369/00* (2013.01); *C08J 2423/12* (2013.01); *C08K 2003/3063* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 7,655,721 B2 | 2/2010 | Watanabe et al. | |
| 10,479,877 B2 | 11/2019 | Idemitsu et al. | |
| 2011/0237709 A1* | 9/2011 | Takeuchi | C08L 23/0815 524/394 |

FOREIGN PATENT DOCUMENTS

| | | | |
|---|---|---|---|
| CN | 105623029 | * | 6/2016 |
| JP | 2006-83369 A | | 3/2006 |
| JP | 2010-260934 A | | 11/2010 |
| JP | 2013-213153 A | | 10/2013 |
| JP | 2015-203098 A | | 11/2015 |
| JP | 2016-113480 A | | 6/2016 |
| JP | 2016-204480 A | | 12/2016 |
| JP | 2018-76389 A | | 5/2018 |
| KR | 10-2017-0132226 A | | 12/2017 |

OTHER PUBLICATIONS

International Search Report dated Feb. 18, 2020, issued in counterpart International Application No. PCT/JP2019/050974 (2 pages).
Wang, Ju-Ying et al., "Quick Reference Book for Varieties and Options of Plastic Auxiliary Agents", p. 161; Cited in CN Office Action dated Oct. 9, 2023. (1 page).

* cited by examiner

*Primary Examiner* — David J Buttner
(74) *Attorney, Agent, or Firm* — WHDA, LLP (57) ABSTRACT

The polycarbonate resin composition according to the present invention includes: 50 to 90% by mass of polycarbonate resin (A); 2.0 to 20% by mass of olefin polymer (B); 5 to 40% by mass of basic magnesium sulfate (C) selected from fibrous basic magnesium sulfate (C-1) and fan-shaped basic magnesium sulfate (C-2); 0.1 to 8% by mass of at least one (D) selected from a fatty acid metal salt and a fatty acid; and 1 to 20% by mass of elastomer (E).

12 Claims, 1 Drawing Sheet

POLYCARBONATE RESIN COMPOSITION, METHOD FOR PRODUCING THE SAME, MASTERBATCH PELLET, AND MOLDED BODY

TECHNICAL FIELD

The present invention relates to a polycarbonate resin composition, a method for producing the same, masterbatch pellets, and a molded body.

BACKGROUND ART

Polycarbonate resins have excellent mechanical properties and thermal properties, and are therefore widely used in various fields such as OA equipment, electronic and electrical equipment, and automobiles. However, the polycarbonate resin has poor processability due to its high melt viscosity, and is inferior in chemical resistance because of being a non-crystalline resin. Therefore, it is known to add a polyolefin resin to the polycarbonate resin in order to improve the chemical resistance of the polycarbonate resin. Many resin compositions to which a compatibilizer such as an elastomer or a filler is added have been proposed in order to enhance the compatibility between the two having different properties and to impart practical mechanical properties.

For example, Patent Literature 1 has disclosed a technique for adding a styrene-based thermoplastic elastomer as a compatibilizer and a fibrous filler such as glass fiber or carbon fiber to a resin including a polycarbonate-based resin and a polypropylene-based resin in order to impart mechanical properties such as rigidity to a polycarbonate resin composition.

CITATION LIST

Patent Literature

Patent Literature 1: JP 2016-204480 A

SUMMARY OF INVENTION

Technical Problem

However, the polycarbonate resin composition containing glass fibers has a problem in processability. In addition, the molded body obtained by curing the polycarbonate resin composition containing the glass fiber has insufficient impact strength, and the appearance may be impaired due to the glass fiber.

Therefore, fibrous basic magnesium sulfate has been attracting attention as a filler having a smaller fiber diameter than glass fiber, having a reinforcing effect, and that can provide the molded body having an excellent appearance. Fibrous basic magnesium sulfate is a biosoluble and safe filler. However, fibrous basic magnesium sulfate is weakly basic, and if it is added to a polycarbonate resin that is weak against a base, thereby hydrolyzing the polycarbonate resin. This case causes a problem of kneading itself being impossible.

Therefore, an object of the present invention is to provide a polycarbonate resin composition that can be kneaded and molded without hydrolysis, has excellent processability, and can obtain a molded product having good mechanical properties and appearance, a method for producing the same, masterbatch pellets, and a molded body.

Solution to Problem

As a result of intensive investigations to achieve the above object, the present inventors have found that even when fibrous basic magnesium sulfate is added to the polycarbonate resin, kneading is possible without hydrolysis of the polycarbonate resin and the processability is also improved as long as it contains an olefin polymer, at least one selected from fatty acid metal salt and a fatty acid, and an elastomer, and the present invention has been completed.

That is, the present invention relates to a polycarbonate resin composition including: 50 to 90% by mass of polycarbonate resin (A); 2.0 to 20% by mass of olefin polymer (B); 5 to 40% by mass of basic magnesium sulfate (C) selected from fibrous basic magnesium sulfate (C-1) and fan-shaped basic magnesium sulfate (C-2); 0.1 to 8% by mass of at least one (D) selected from a fatty acid metal salt and a fatty acid; and 1 to 20% by mass of elastomer (E).

In addition, the present invention relates to a method for producing a polycarbonate resin composition, the method comprising: a first step of melt-kneading 2 to 50% by mass of olefin polymer (B), 40 to 70% by mass of basic magnesium sulfate (C) selected from fibrous basic magnesium sulfate (C-1) and fan-shaped basic magnesium sulfate (C-2), 0.1 to 5% by mass of at least one (D) selected from a fatty acid metal salt and a fatty acid, and 1 to 50% by mass of elastomer (E) to obtain masterbatch pellets; and a second step of melt-kneading 10 to 60% by mass of the masterbatch pellets and 40 to 90% by mass of polycarbonate resin (A) to produce a polycarbonate resin composition.

In addition, the present invention relates to a method for producing a polycarbonate resin composition, the method comprising: a first step of melt-kneading 28 to 50% by mass of olefin polymer (B), 40 to 70% by mass of basic magnesium sulfate (C) selected from fibrous basic magnesium sulfate (C-1) and fan-shaped basic magnesium sulfate (C-2), and 0.1 to 5% by mass of at least one (D) selected from a fatty acid metal salt and a fatty acid to obtain masterbatch pellets; and a second step of melt-kneading 10 to 59% by mass of the masterbatch pellets, 40 to 85% by mass of polycarbonate resin (A), and 1 to 20% by mass of elastomer (E) to produce a polycarbonate resin composition.

In addition, the present invention relates to a method for producing a polycarbonate resin composition by melt-kneading 50 to 90% by mass of polycarbonate resin (A), 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E).

In addition, the present invention relates to a method for producing a polycarbonate resin composition by melt-kneading 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E), and then by adding and melt-kneading 50 to 90% by mass of polycarbonate resin (A).

Moreover, the present invention is masterbatch pellets for producing a polycarbonate resin composition by kneading with a diluent including polycarbonate resin (A), the masterbatch pellets including 2 to 50% by mass of olefin polymer (B), 40 to 70% by mass of basic magnesium sulfate (C) selected from fibrous basic magnesium sulfate (C-1) and fan-shaped basic magnesium sulfate (C-2), 0.1 to 5% by mass of at least one (D) selected from a fatty acid metal salt and a fatty acid, and 1 to 50% by mass of elastomer (E).

In addition, the present invention relates to a molded body, which is a molded product of the polycarbonate resin composition.

Advantageous Effect of Invention

The present invention can provide a polycarbonate resin composition that can be kneaded and molded without hydrolysis, has excellent processability, and can obtain a molded product having good mechanical properties and appearance, a method for producing the same, masterbatch pellets, and a molded body.

DESCRIPTION OF EMBODIMENTS

1. Polycarbonate Resin Composition

The polycarbonate resin composition of the present invention includes: 50 to 90% by mass of polycarbonate resin (A); 2.0 to 20% by mass of olefin polymer (B); 5 to 40% by mass of basic magnesium sulfate (C) selected from fibrous basic magnesium sulfate (C-1) and fan-shaped basic magnesium sulfate (C-2); 0.1 to 8% by mass of at least one (D) selected from a fatty acid metal salt and a fatty acid; and 1 to 20% by mass of elastomer (E). The polycarbonate resin composition of the present invention includes each component in the above percentage, thereby forming a sea-island structure having the sea phase including the polycarbonate resin with the islands containing the remaining components dispersed therein.

The outer circumference of the island is composed of an elastomer. Inside the island, basic magnesium sulfate exists being mixed with the remaining components such as an olefin polymer. This prevents the basic magnesium sulfate from coming into direct contact with the polycarbonate resin in the sea phase. It is considered that the above result allows the polycarbonate resin composition to be kneaded and molded without hydrolysis of the polycarbonate resin. Hereinafter, each component will be described.

(A) Polycarbonate Resin

The polycarbonate resin is not particularly limited, and for example, aliphatic polycarbonate and aromatic polycarbonate can be used. Of these, aromatic polycarbonate is preferable. A commercially available product may be used as the polycarbonate resin, or a synthetic resin may be used as appropriate.

The method for synthesizing the polycarbonate resin is not particularly limited and may be appropriately selected depending on the intended purpose. Examples thereof include a method of synthesizing a divalent phenol and a carbonate precursor by a solution method or a melting method. In addition, for example, a molecular weight modifier, a branching agent, a catalyst may be appropriately used as necessary.

Examples of the divalent phenol include bisphenol A [2,2-bis(4-hydroxyphenyl)propane], hydroquinone, 2,2-bis(4-hydroxyphenyl)pentane, 2,4'-dihydroxydiphenylmethane, bis(2-hydroxyphenyl)methane, bis(4-hydroxyphenyl)methane, bis(4-hydroxy-5-nitrophenyl)methane, 1,1-bis(4-hydroxyphenyl)ethane, 3,3-bis(4-hydroxydiphenyl)pentane, 2,2'-dihydroxydiphenyl, 4,4'-dihydroxydiphenyl, 2,6-dihydroxynaphthalene, bis(4-hydroxyphenyl)sulfone, bis(3,5-diethyl-4-hydroxyphenyl)sulfone, 2,2-bis(3,5-dimethyl-4-hydroxyphenyl)propane, 2,4'-dihydroxydiphenylsulfone, 5'-chloro-2,4'-dihydroxydiphenylsulfone, bis(4-hydroxyphenyl)diphenyl ether, 4,4'-dihydroxy-3,3'-dichlorophenylether, 4,4'-dihydroxy-2,5-dichlorodiphenylether, bis(4-dihydroxy-5-propylphenyl)methane, bis(4-dihydroxy-2,6-dimethyl-3-methoxyphenyl)methane, 1,1-bis(4-hydroxy-2-ethylphenyl)ethane, 2,2-bis(3-phenyl-4-hydroxyphenyl)propane, bis(4-hydroxyphenyl)cyclohexylmethane, and 2,2-bis(4-hydroxyphenyl)-1-phenylpropane. These may be used singly or in combination of two or more. Of these, bis(4-hydroxyphenyl)alkane-based compounds are preferable, and bisphenol A is particularly preferable, from the viewpoint of easy availability on the market.

The carbonate precursor is not particularly limited and can be appropriately selected depending on the intended purpose. Examples thereof include carbonyl halide, carbonate, and haloformate. Specific examples thereof include phosgene, diphenyl carbonate, dihaloformate of divalent phenol, and mixtures thereof.

The melt flow rate (MFR) of the polycarbonate resin can be appropriately selected depending on the intended purpose, but is preferably 2 to 25 g/10 minutes, and more preferably 2 to 10 g/10 minutes. When the melt flow rate of the polycarbonate resin is 2 g/10 minutes or more, a polycarbonate resin composition having good molding processability can be obtained. In addition, when the melt flow rate is 25 g/10 minutes or less, sufficient impact strength can be imparted to the molded body.

The content of the polycarbonate resin is in the range of 50 to 90% by mass, and preferably 55 to 75% by mass, with respect to the total amount of the polycarbonate resin composition. When the content of the polycarbonate resin is 50% by mass or more, a molded body having high impact strength derived from the polycarbonate resin can be obtained. Whereas, when the content of the polycarbonate resin is 90% by mass or less, the reinforcing effect due to the filler can be sufficiently exhibited and a desired flexural modulus can be imparted to the molded body.

(B) Olefin Polymer

Examples of the olefin polymer include an ethylene polymer, a propylene polymer, an ethylene-propylene random copolymer, and an ethylene-propylene block copolymer, particularly preferably a propylene polymer, and more preferably a propylene homopolymer. The olefin polymer may be used singly or in combination of two or more. The melt flow rate (MFR) of the olefin polymer is typically in the range of 3 to 300 g/10 minutes, and preferably in the range of 6 to 100 g/10 minutes.

The content of the olefin polymer is in the range of 2.5 to 20% by mass, and preferably 8 to 15% by mass, with respect to the total amount of the polycarbonate resin composition. When the content of the olefin polymer is 2.5% by mass or more, hydrolysis of the polycarbonate resin due to basic magnesium sulfate can be suppressed. Whereas, when the content of the olefin polymer is 20% by mass or less, a molded body having a desired impact strength can be obtained.

(C) Basic Magnesium Sulfate

At least one selected from fibrous basic magnesium sulfate (C-1) and fan-shaped basic magnesium sulfate (C-2) as described below is used as the basic magnesium sulfate.

(C-1) Fibrous Basic Magnesium Sulfate

The fibrous basic magnesium sulfate can be obtained by hydrothermal synthesis with, for example, magnesium hydroxide and magnesium sulfate, as raw materials, produced from seawater. The average major axis of the fibrous basic magnesium sulfate is generally in the range of 5 to 100 µm, preferably in the range of 10 to 60 µm. In addition, the average minor axis of the fibrous basic magnesium sulfate is generally in the range of 0.1 to 5.0 µm, preferably in the range of 0.2 to 2.0 µm, and particularly preferably in the range of 0.2 to 1.0 µm.

Conventionally, the glass fiber used as a filler has an average fiber diameter (average minor axis) of about 10 µm at the minimum. Fibrous basic magnesium sulfate has a smaller average fiber diameter (average minor axis) than glass fiber, and therefore is more hardly recognized as compared with the glass fiber.

The fibrous basic magnesium sulfate generally has an average aspect ratio (average major axis/average minor axis) of 2 or more, preferably 5 or more, and particularly preferably in the range of 5 to 80. The average major axis and average minor axis of fibrous basic magnesium sulfate can be calculated from the average values of the major axis and minor axis of 100 pieces of particles measured from a magnified image by a scanning electron microscope (SEM). In addition, the fibrous basic magnesium sulfate may be an aggregate or a conjugate of a plurality of fibrous particles.

(C-2) Fan-Shaped Basic Magnesium Sulfate

Fan-shaped basic magnesium sulfate is particles obtained by joining and connecting a part of a plurality of fibrous basic magnesium sulfate in a fan shape, and for example, the average particle length is 2 to 100 µm, the average particle width is 1 to 40 µm, and the average aspect ratio is about 1 to 100. Herein, the average particle length refers to the dimension in the longitudinal direction of the particles, and the average particle width refers to the maximum dimension in the short direction of the particles. The longitudinal direction of the particles is the direction in which the particle length is maximized, and the short direction of the particles is the direction orthogonal to the longitudinal direction. In addition, the average aspect ratio is (average particle length/ average particle width).

Figure 1:
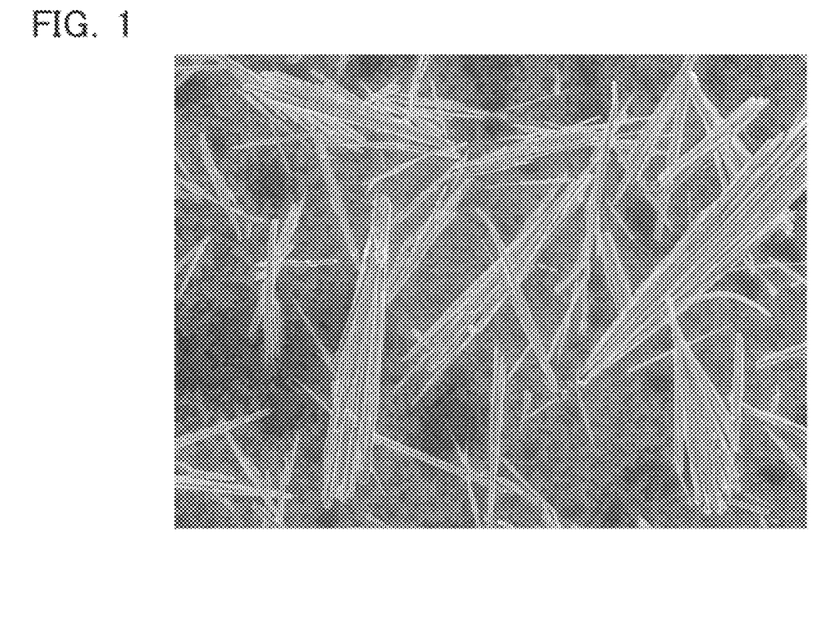
FIG. 1 shows a scanning electron micrograph of fan-shaped basic magnesium sulfate.

FIG. 1 shows a scanning micrograph of an example of fan-shaped basic magnesium sulfate that can be used in the present invention. The fan-shaped basic magnesium sulfate shown here has a fan shape obtained by bundling a plurality of fibrous basic magnesium sulfates (average particle length of 33.0 µm, average particle width of 6.0 µm, average aspect ratio of 5.5). Each fibrous basic magnesium sulfate has an average fiber length of 33.0 µm, an average fiber diameter of 1.3 µm, and an average aspect ratio of 26.

Each fibrous basic magnesium sulfate constituting the fan-shaped basic magnesium sulfate has an average fiber length of 2 to 100 µm, an average fiber diameter of 0.1 to 5 µm, and an average aspect ratio of 1 to 1000. The plurality of fibrous basic magnesium sulfates are bundled at one end and spread at the other end, for example. In addition, the plurality of fibrous basic magnesium sulfates may be bundled at arbitrary positions in the longitudinal direction and be spread at both ends. Such a fan-shaped basic magnesium sulfate can be produced and confirmed according to the methods described in, for example, JP 4-36092 A and JP 6-99147 A.

In addition, the fan-shaped basic magnesium sulfate does not necessarily have to be in a state in which individual fibrous basic magnesium sulfates are confirmed, and in some cases, fibrous basic magnesium sulfates may be bonded to each other in the longitudinal direction. When the fibrous basic magnesium sulfate having the above shape and further having an average fiber length, an average fiber diameter, and an average aspect ratio in a predetermined range is confirmed to be included, this can be regarded as the fan-shaped basic magnesium sulfate.

The content of the basic magnesium sulfate is in the range of 5 to 40% by mass, preferably in the range of 5 to 30% by mass, and more preferably in the range of 10 to 30% by mass, with respect to the total amount of the polycarbonate resin composition. When the content of the basic magnesium sulfate is 5% by mass or more, the effect of the basic magnesium sulfate is exhibited, and a desired flexural modulus can be imparted to the molded body. Whereas, when the content of basic magnesium sulfate is 40% by mass or less, a polycarbonate resin composition having good processability can be obtained.

(D) Fatty Acid Metal Salts and Fatty Acids

The polycarbonate resin composition of the present invention contains at least one selected from a fatty acid metal salt and a fatty acid, and thereby basic magnesium sulfate is preferentially distributed in the olefin polymer. At least one of a fatty acid metal salt and a fatty acid may be contained in the polycarbonate resin composition, and the fatty acid metal salt is particularly preferable.

The fatty acid preferably has a carbon atom number in the range of 12 to 22, and may be a saturated fatty acid or an unsaturated fatty acid. Examples of the saturated fatty acid include lauric acid, tridecylic acid, myristic acid, pentadecylic acid, palmitic acid, margaric acid, stearic acid, nonadecylic acid, arachidic acid, and behenic acid. Examples of the unsaturated fatty acid include myristoleic acid, palmitoleic acid, oleic acid, elaidic acid, vaccenic acid, gadoleic acid, and erucic acid. Examples of the metal salt include magnesium salt, calcium salt, aluminum salt, lithium salt, and zinc salt. Particularly, at least one selected from the group consisting of magnesium stearate, calcium stearate, and aluminum stearate is preferable.

The contents of the fatty acid metal salt and the fatty acid are in the range of 0.1 to 8% by mass, preferably in the range of 0.1 to 7% by mass, more preferably in the range of 0.5 to 6% by mass, with respect to the total amount of the polycarbonate resin composition. When the contents of the fatty acid metal salt and the fatty acid are 0.1% by mass or more, the effect of adding these compounds is exhibited. Whereas, when the contents of the fatty acid metal salt and the fatty acid are 8% by mass or less, a polycarbonate resin composition having good thermal stability can be obtained.

(E) Elastomer

A styrene-based thermoplastic elastomer is preferably used as the elastomer. The styrene-based thermoplastic elastomer is preferably a block copolymer represented by the following formula (e1) or (e2).

$$X_k-Y_m-X_n \quad (e1)$$

$$X_m-Y_n \quad (e2)$$

In the above formula, X represents an aromatic vinyl polymer block. In the formula (e1), the degree of polymerization may be the same or different at both ends of the molecular chain. In addition, Y is selected from a butadiene polymer block, an isoprene polymer block, a butadiene/isoprene copolymer block, a hydrogenated butadiene polymer block, a hydrogenated isoprene polymer block, a hydrogenated butadiene/isoprene copolymer block, a partially hydrogenated butadiene polymer block, a partially hydrogenated isoprene polymer block, and a partially hydrogenated butadiene/isoprene copolymer block, k, m, and n are integers of 1 or more.

Specific examples thereof include styrene-ethylene/butylene-styrene copolymer, styrene-ethylene/propylene-styrene copolymer, styrene-ethylene/ethylene/propylene-styrene copolymer, styrene-butadiene-butene-styrene copolymer, styrene-butadiene-styrene copolymer, styrene-isoprene-styrene copolymer, styrene-hydrogenated butadiene diblock copolymer, styrene-hydrogenated isoprene diblock copolymer, styrene-butadiene diblock copolymer, and styrene-isoprene diblock copolymer, and of these, styrene-ethylene/butylene-styrene copolymer, styrene-ethylene/propylene-styrene copolymer, styrene-ethylene/ethylene/propylene-styrene copolymer, and styrene-butadiene-butene-styrene copolymer are most preferable.

The content of the X component in the block copolymer is 20 to 80% by mass, preferably 30 to 75% by mass, and more preferably 40 to 70% by mass. When the amount of the X component is 20% by mass or more, appropriate rigidity and impact strength can be imparted to the molded body. Whereas, when the X component is 80% by mass or less, a molded body having a desired impact strength can be obtained.

The weight average molecular weight of the styrene-based thermoplastic elastomer is preferably 250000 or less, more preferably 200000 or less, and still more preferably 150000 or less. When the weight average molecular weight is 250000 or less, there is no possibility of lower molding processability or deteriorated dispersibility in the polycarbonate resin composition. In addition, the lower limit of the weight average molecular weight is not particularly limited, but is preferably 40000 or more, and more preferably 50000 or more.

The weight average molecular weight is a value measured by the following method. That is, the molecular weight is measured in terms of polystyrene by a gel permeation chromatograph, and the weight average molecular weight is calculated. The melt flow rate (230° C., 2.16 kg) of the styrene-based thermoplastic elastomer is preferably 0.1 to 10 g/10 min, more preferably 0.15 to 9 g/10 min, and particularly preferably 0.2 to 8 g/10 min. When the melt flow rate of the styrene-based thermoplastic elastomer is in the range of 0.1 to 10 g/10 min, a molded body having sufficient toughness can be obtained.

The content of the elastomer is in the range of 1 to 20% by mass, preferably in the range of 1 to 15% by mass, and more preferably in the range of 1 to 12% by mass, with respect to the total amount of the polycarbonate resin composition. When the content of the elastomer is 1.0% by mass or more, the effect of adding the elastomer can be obtained. Whereas, when the content of the elastomer is 20% by mass or less, appropriate rigidity and long-term creep resistance can be imparted to the molded body.

In addition, the polycarbonate resin composition of the present invention may include other components as long as the effects of the present invention are not impaired. Examples of other components include antioxidants, UV absorbers, pigments, antistatic agents, copper damage inhibitors, flame retardants, neutralizers, foaming agents, plasticizers, nucleating agents, bubble inhibitors, and cross-linking agents. The content of the other components is preferably 1% by mass or less, more preferably 0.5% by mass or less, with respect to the total amount of the polycarbonate resin composition.

2. Method for Producing Polycarbonate Resin Composition

A method for producing the polycarbonate resin composition will be described. The method for producing the polycarbonate resin composition of the present invention includes: (production method I) a method having the first step of melt-kneading olefin polymer (B), basic magnesium sulfate (C) selected from fibrous basic magnesium sulfate (C-1) and fan-shaped basic magnesium sulfate (C-2), at least one (D) selected from a fatty acid metal salt and a fatty acid, and the elastomer (E) to obtain masterbatch pellets, and the second step of melt-kneading the masterbatch pellet and the polycarbonate resin (A) to produce a polycarbonate resin composition; (production method II) a method having the first step of melt-kneading olefin polymer (B), basic magnesium sulfate (C) selected from fibrous basic magnesium sulfate (C-1) and fan-shaped basic magnesium sulfate (C-2), and at least one (D) selected from a fatty acid metal salt and a fatty acid to obtain masterbatch pellets, and the second step of melt-kneading the masterbatch pellets, the polycarbonate resin (A), and the elastomer (E) to produce a polycarbonate resin composition; (production Method III) a method of melt-kneading polycarbonate resin (A), olefin polymer (B), basic magnesium sulfate (C) selected from fibrous basic magnesium sulfate (C-1) and fan-shaped basic magnesium sulfate (C-2), at least one (D) selected from a fatty acid metal salt and a fatty acid, and elastomer (E); and (production method IV) a method of melt-kneading olefin polymer (B), basic magnesium sulfate (C) selected from fibrous basic magnesium sulfate (C-1) and fan-shaped basic magnesium sulfate (C-2), at least one (D) selected from a fatty acid metal salt and a fatty acid, and elastomer (E) and then by adding and melt-kneading polycarbonate resin (A).

Any of the above methods of (production method I) to (production method IV) can provide the polycarbonate resin composition of the present invention, that is, a sea-island structure in which island phases having an elastomer on the outer circumference are dispersed in the sea phase including the polycarbonate resin. Basic magnesium sulfate is present inside the island phase together with the remaining components such as the olefin polymer. As a result, basic magnesium sulfate does not come into direct contact with the polycarbonate resin in the sea phase, allowing hydrolysis of the polycarbonate resin to be avoided.

Production Method I

Production method I is a production method having the first step of melt-kneading 2 to 50% by mass of olefin polymer (B), 40 to 70% by mass of basic magnesium sulfate (C) selected from fibrous basic magnesium sulfate (C-1) and fan-shaped basic magnesium sulfate (C-2), 0.1 to 5% by mass of at least one (D) selected from a fatty acid metal salt and a fatty acid, and 1 to 50% by mass of elastomer (E) to obtain masterbatch pellets; and the second step of melt-kneading 10 to 60% by mass of the masterbatch pellets and 40 to 90% by mass of polycarbonate resin (A) to produce a polycarbonate resin composition.

In production method I, the first step can provide masterbatch pellets in which basic magnesium sulfate is incorporated into the olefin polymer, by melt-kneading olefin polymer (B), basic magnesium sulfate (C), at least one (D) selected from a fatty acid metal salt and a fatty acid, and an elastomer (E). Kneading such masterbatch pellets with the polycarbonate resin can effectively suppress hydrolysis of the polycarbonate resin.

The melt-kneading method in production method I is not particularly limited in both the first step and the second step, and examples thereof include a method using a single-screw extruder, a twin-screw extruder, a Banbury mixer, a kneader, and a kneading roll. The melt-kneading temperature in the first step is preferably 160 to 240° C., and more preferably 180 to 230° C., and that in the second step is preferably 230 to 280° C., and more preferably 240 to 260° C.

In the first step, each percentage of "2 to 50% by mass of olefin polymer (B), 40 to 70% by mass of basic magnesium sulfate (C), 0.1 to 5% by mass of at least one (D) selected from a fatty acid metal salt and a fatty acid, and 1 to 50% by mass of elastomer (E)" is a percentage in the production of masterbatch pellets. By adjusting the percentage of the masterbatch pellets produced in the above percentage and polycarbonate resin (A) in the second step can adjust the percentages of olefin polymer (B), basic magnesium sulfate (C), at least one (D) selected from a fatty acid metal salt and a fatty acid, and elastomer (E) in the polycarbonate resin composition.

In the first step, the method for obtaining the masterbatch pellets is not particularly limited, and the masterbatch pellets can be obtained by melt-kneading and then by molding into pellets with a known method.

In addition, in the second step, the shape of the polycarbonate resin composition obtained by melt-kneading is not limited, and molding can be performed into any shape such as a strand shape, a sheet shape, a flat plate shape, or a pellet shape. Considering molding in a later step, a pellet shape is preferable from the viewpoint of easy supply to the molding machine.

Production Method II

Production method II is a production method having the first step of melt-kneading 23 to 50% by mass of olefin polymer (B), 40 to 70% by mass of basic magnesium sulfate (C) selected from fibrous basic magnesium sulfate (C-1) and fan-shaped basic magnesium sulfate (C-2), and 0.1 to 5% by mass of at least one (D) selected from a fatty acid metal salt and a fatty acid to obtain masterbatch pellets; and the second step of melt-kneading 10 to 60% by mass of the masterbatch pellets and 40 to 90% by mass of polycarbonate resin (A), and 1 to 20% by mass of elastomer (E) to produce a polycarbonate resin composition.

The melt-kneading method in production method II is the same as that in production method I. In production method II, elastomer (E) is blended with the polycarbonate resin in the masterbatch pellets in the second step. This has the advantages of allowing not only using the masterbatch including a commercially available polyolefin, basic magnesium sulfate, and a fatty acid metal salt, but also changing only the content of the elastomer. The melt-kneading temperature is preferably 230 to 280° C., more preferably 240 to 270° C., and still more preferably 245 to 260° C., from the viewpoint of preventing thermal decomposition of the polycarbonate resin.

In the first step, each percentage of "28 to 50% by mass of olefin polymer (B), 40 to 70% by mass of basic magnesium sulfate (C), and 0.1 to 5% by mass of at least one (D) selected from a fatty acid metal salt and a fatty acid" is a percentage in the production of masterbatch pellets. By adjusting the percentage of the masterbatch pellets produced in the above percentage, polycarbonate resin (A), and elastomer (E) in the second step can adjust the percentages of olefin polymer (B), basic magnesium sulfate (C), at least one (D) selected from a fatty acid metal salt and a fatty acid, and elastomer (E) in the polycarbonate resin composition.

In addition, in production method II, the shape of the polycarbonate resin composition obtained by melt-kneading is not particularly limited, and molding can be performed into any shape such as a strand shape, a sheet shape, a flat plate shape, or a pellet shape, as described in production method I.

Production Method III

Production method III is a production method of melt-kneading 50 to 90% by mass of polycarbonate resin (A), 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E).

The melt-kneading method in production method III is the same as that in production method I. Production method III has the advantages of preventing thermal decomposition of the polycarbonate resin and simplifying the production step by melt-kneading together polycarbonate resin (A), olefin polymer (B), basic magnesium sulfate (C), at least one (D) selected from a fatty acid metal salt and a fatty acid, and elastomer (E). The melt-kneading temperature is preferably 230 to 280° C., more preferably 240 to 270° C., and still more preferably 245 to 260° C., from the viewpoint of preventing thermal decomposition of the polycarbonate resin.

In addition, in production method III, the shape of the polycarbonate resin composition obtained by melt-kneading is not particularly limited, and molding can be performed into any shape such as a strand shape, a sheet shape, a flat plate shape, or a pellet shape, as described in production method I.

Production Method IV

Production method IV is a production method of melt-kneading 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E), and then further adding and melt-kneading 50 to 90% by mass of polycarbonate resin (A).

The melt-kneading method in production method IV is the same as that in production method I. In production method IV, the production step can be simplified by melt-kneading olefin polymer (B), basic magnesium sulfate (C), at least one (D) selected from a fatty acid metal salt and a fatty acid, and elastomer (E) and then adding polycarbonate resin (A). The temperature of the previous melt-kneading is preferably 160 to 240° C., and more preferably 180 to 230° C., and the temperature of the melt-kneading after adding polycarbonate resin (A) is preferably 230 to 280° C., and more preferably 240 to 260° C.

In addition, in production method IV, the shape of the polycarbonate resin composition obtained by melt-kneading is not particularly limited, and molding can be performed into any shape such as a strand shape, a sheet shape, a flat plate shape, or a pellet shape, as described in production method I.

3. Masterbatch (MB) Pellets

Masterbatch pellets will be described below. The masterbatch pellets of the present invention are a raw-material for producing a polycarbonate resin composition by kneading with a diluent including polycarbonate resin (A).

The masterbatch pellets of the present invention include 2 to 50% by mass of olefin polymer (B), 40 to 70% by mass of basic magnesium sulfate (C) selected from fibrous basic magnesium sulfate (C-1) and fan-shaped basic magnesium sulfate (C-2), 0.1 to 5% by mass of at least one (D) selected from a fatty acid metal salt and a fatty acid, and 1 to 50% by mass of elastomer (E). Preferably, included are 2 to 45% by mass of olefin polymer (B), 55 to 70% by mass of basic magnesium sulfate (C), 0.1 to 4.5% by mass of at least one (D) selected from a fatty acid metal salt and a fatty acid, and 1 to 45% by mass of elastomer (E). More preferably, included are 2 to 40% by mass of olefin polymer (B), 60 to 70% by mass of basic magnesium sulfate (C), 0.5 to 4% by mass of at least one (D) selected from a fatty acid metal salt and a fatty acid, and 2 to 40% by mass of elastomer (E).

Details of olefin polymer (B), basic magnesium sulfate (C), at least one (D) selected from a fatty acid metal salt and a fatty acid, and elastomer (E) are as described above, and thus the description thereof will be omitted. In addition, the method for producing the masterbatch pellets is the same as the first step of production method I for the polycarbonate resin composition described above. The diluent is not particularly limited as long as it is a resin including polycarbonate resin (A) described above.

4. Molded Body

The molded body will be described below. The molded body of the present invention can be produced by molding the polycarbonate resin composition of the present invention. Examples of the method for molding the polycarbonate resin composition include: a method of producing the polycarbonate resin composition by the above method and molding the polycarbonate resin composition; and a method of mixing the masterbatch pellets and the diluted pellets and directly molding the mixture with a molding machine. In addition, examples of the molding machine used for molding include a rolling molding machine such as a calendar molding machine, a vacuum molding machine, an extrusion molding machine, an injection molding machine, a blow molding machine, and a press molding machine.

The molded body of the present invention has an excellent property of high Izod impact strength. The Izod impact strength is an index representing the strength against impact. The value of the Izod impact strength in the present description can be defined as the result measured by the method described in examples described later. Specifically, it is the result of measurement by the method in accordance with JIS K7110 with the Izod impact tester.

Moreover, the molded body of the present invention is also excellent in high flexural modulus. The flexural modulus is an index representing the difficulty of deformation of the molded body, and can be defined as the result measured by the method described in examples described later. Specifically, it is the result of measurement by the method in accordance with JIS K7171 with a universal dynamic testing machine.

The molded body of the present invention is obtained by molding the polycarbonate resin composition that is obtained by using, as a filler, fibrous basic magnesium sulfate having a small average fiber diameter (average minor axis) or fan-shaped basic magnesium sulfate including such fibrous basic magnesium sulfate. Therefore, the molded body of the present invention has an advantage of an excellent appearance as compared with the case where glass fiber having a large average fiber diameter (average minor axis) is used as a filler, and thus usefulness for an exterior portion that is visible to the public.

Hereinafter, the present invention will be specifically described based on examples, but these do not limit the object of the present invention, and the present invention is not limited to these examples.

The measurement method used in the present examples will be shown.

Melt Flow Rate (MFR)

A melt flow rate test was conducted in accordance with JIS K7210 with a melt flow indexer (G-01, manufactured by Toyo Seiki Seisakusho Co., Ltd.), and the melt flow rate (MFR) was evaluated.

Izod Impact Strength (Izod)

The Izod impact strength was evaluated by conducting a test in accordance with JIS K7110 with an Izod impact tester (manufactured by MYS-TESTER Co., Ltd.). The hammer was 2.75 J.

Flexural Modulus (FM)

A 3-point bending test using a universal dynamic testing machine (manufactured by Imada Co., Ltd.) was performed, and from the load deflection curve obtained, the flexural modulus was evaluated by the method in accordance with JIS K7171. The distance between the fulcrums was 40 mm, and the load speed was 10 mm/min.

Transmission Electron Microscope (TEM) Observation

The obtained polycarbonate resin composition was embedded in a photocurable acrylic resin, and then cut out so that the cross section of the fibrous basic magnesium sulfate in the composition in the fiber direction was able to be observed. Moreover, this was fixed to an aluminum sample pin. Trimming and surface facing were performed, and an ultrathin section was prepared by using a cryomicrotome (FCS, manufactured by LEICA). The obtained ultrathin section was used as a sample and observed by using a transmission electron microscope (TEM) (JEM-2100F, manufactured by JEOL Ltd.).

Production of Resin Composition

The components used in examples and comparative examples are shown below.

Polycarbonate resin (A):

[MFR (temperature of 240° C., load of 5.000 kg): 4.5 g/10 minutes]

Olefin polymer (B):

Polypropylene resin [MFR (temperature of 230° C., load of 2.160 kg): 6 g/10 minutes]

Fibrous basic magnesium sulfate (C-1):

(MOS-HIGE A-1, manufactured by Ube Material Industries Ltd., average major axis: 15 μm, average minor axis: 0.5 μm)

Fan-shaped basic magnesium sulfate (C-2):

(Average particle length of 33.0 μm, average particle width of 6.0 μm, average aspect ratio of 5.5)

Fatty acid metal salt (D): magnesium stearate

Elastomer (E): styrene-ethylene-butylene-styrene (SEBS, Tough Tech H1043, manufactured by Asahi Kasei Corporation)

Glass fiber (F):

(CS (F) 3-PE-960S, manufactured by Nitto Boseki Co., Ltd., fiber major axis: 3 mm, fiber minor axis: 13 μm)

EXAMPLE 1

29.5% by mass of polypropylene resin (B), 63.6% by mass of fibrous basic magnesium sulfate particles (C-1), and 1.9% by mass of magnesium stearate (D) were mixed, and the obtained mixture was melt-kneaded at 180° C. for 2 minutes. For melt-kneading, a melt-kneading extruder, Labplast Mill Roller Mixer (R60, capacity of 60 cc, manufactured by Toyo Seiki Co., Ltd.) was used, and the rotation speed of the shaft was 120 rpm. The obtained melt-kneaded product was formed into a sheet by hot pressing (temperature of 200° C.) and then cut to obtain masterbatch pellets.

21% by mass of the masterbatch pellets, 76% by mass of polycarbonate resin (A), and 3% by mass of elastomer (E) were mixed. Then, a twin-screw melt-kneading extruder (L/D=25, manufactured by Imoto Seisakusho Co., Ltd.) was used to perform melt-kneading at 250° C. and 50 rpm to obtain the polycarbonate resin composition in Example 1.

EXAMPLE 2

The polycarbonate resin composition in Example 2 was obtained in the same manner as in Example 1, except that the percentage of polycarbonate resin (A) was changed to 73.9% by mass and the percentage of elastomer (E) was changed to 5.1% by mass.

EXAMPLE 3

Masterbatch pellets were obtained in the same manner as in Example 1, except that 27.5% by mass of polypropylene resin (B), 64.2% by mass of fibrous basic magnesium sulfate particles (C-1), 1.7% by mass of magnesium stearate (D), and 6.6% by mass of elastomer (E) were used.

The polycarbonate resin composition in Example 3 was obtained in the same manner as in Example 1, except that 22.9% by mass of the masterbatch pellets and 73.9% by mass of polycarbonate resin (A) were used.

EXAMPLE 4

The polycarbonate resin composition in Example 4 was obtained in the same manner as in Example 3, except that 25.5% by mass of polypropylene resin (B), 55.1% by mass of fibrous basic magnesium sulfate particles (C-1), 1.6% by mass of magnesium stearate (D), and 13.8% by mass of elastomer (E) were used to produce masterbatch pellets, and 24.7% by mass of the masterbatch pellets obtained and 75.3% by mass of polycarbonate resin (A) were mixed.

EXAMPLE 5

The polycarbonate resin composition in Example 5 was obtained in the same manner as in Example 3, except that 22.6% by mass of polypropylene resin (B), 53.3% by mass of fibrous basic magnesium sulfate particles (C-1), 1.5% by mass of magnesium stearate (D), and 22.6% by mass of elastomer (E) were used to produce masterbatch pellets, and 27.4% by mass of the masterbatch pellets obtained and 72.6% by mass of polycarbonate resin (A) were mixed.

EXAMPLE 6

The polycarbonate resin composition in Example 6 was obtained in the same manner as in Example 3, except that 19.6% by mass of polypropylene resin (B), 46.2% by mass of fibrous basic magnesium sulfate particles (C-1), 1.3% by mass of magnesium stearate (D), and 32.9% by mass of elastomer (E) were used to produce masterbatch pellets, and 31.6% by mass of the masterbatch pellets obtained and 68.4% by mass of polycarbonate resin (A) were mixed.

EXAMPLE 7

The polycarbonate resin composition in Example 7 was obtained in the same manner as in Example 4, except that fibrous basic magnesium sulfate particles (C-1) were changed to the same amount of fan-shaped basic magnesium sulfate particles (C-2).

EXAMPLE 8

The polycarbonate resin composition in Example 8 was obtained in the same manner as in Example 5, except that fibrous basic magnesium sulfate particles (C-1) were changed to the same amount of fan-shaped basic magnesium sulfate particles (C-2).

Comparative Example 1

The polycarbonate resin composition in Comparative Example 1 was obtained in the same manner as in Example 1, except that 28.1% by mass of polypropylene resin (B), 70.0% by mass of fibrous basic magnesium sulfate particles (C-1), and 1.9% by mass of magnesium stearate (D) were used to produce masterbatch pellets, and 21% by mass of the masterbatch pellets obtained and 79% by mass of polycarbonate resin (A) were mixed.

Comparative Example 2

Polycarbonate resin (A) was used singly.

Comparative Example 3

80% by mass of polycarbonate resin (A) and 20% by mass of glass fiber (F) were mixed. The obtained mixture was melt-kneaded with a twin-screw melt-kneading extruder to obtain the polycarbonate resin composition in Comparative Example 3. Melt-kneading was performed in the same manner as in Example 1 except that the temperature was changed to 280° C.

Comparative Example 4

80% by mass of polycarbonate resin (A) and 20% by mass of fibrous basic magnesium sulfate particles (C-1) were mixed. Then, as in Example 1, melt-kneading was attempted with a twin-screw melt-kneading extruder; however, kneading failed.

Comparative Example 5

84.7% by mass of polycarbonate resin (A), 14.9% by mass of fibrous basic magnesium sulfate particles (C-1), and 0.4% by mass of fatty acid metal salt (D) were mixed. Then, as in Example 1, melt-kneading was attempted with a twin-screw melt-kneading extruder; however, kneading failed.

Comparative Example 6

79.0% by mass of polycarbonate resin (A), 6.3% by mass of olefin polymer (B), and 14.7% by mass of fibrous basic magnesium sulfate particles (C-1) were mixed. Then, as in Example 1, melt-kneading was attempted with a twin-screw melt-kneading extruder; however, kneading failed.

From the results of Comparative Examples 3 to 6, although the fibrous basic magnesium sulfate particles (C-1) are contained, kneading itself is found to be impossible when olefin polymer (B) and/or fatty acid metal salt (D) are not included.

Comparative Example 7

The polycarbonate resin composition in Comparative Example 7 was obtained in the same manner as in Example 3, except that fibrous basic magnesium sulfate particles (C-1) were changed to the same amount of glass fiber (F).

Comparative Example 8

The polycarbonate resin composition in Comparative Example 8 was obtained in the same manner as in Example 4, except that fibrous basic magnesium sulfate particles (C-1) were changed to the same amount of glass fiber (F).

Comparative Example 9

The polycarbonate resin composition in Comparative Example 9 was obtained in the same manner as in Example 5, except that fibrous basic magnesium sulfate particles (C-1) were changed to the same amount of glass fiber (F).

Comparative Example 10

The polycarbonate resin composition in Comparative Example 10 was obtained in the same manner as in Example 6, except that fibrous basic magnesium sulfate particles (C-1) were changed to the same amount of glass fiber (F).

Comparative Example 11

The polycarbonate resin composition in Comparative Example 11 was obtained in the same manner as in Comparative Example 1, except that fibrous basic magnesium sulfate (C-1) was changed to the same amount of fan-shaped basic magnesium sulfate particles (C-2).

Table 1 below summarizes the contents (mass %) of polycarbonate resin (A), olefin polymer (B), basic magnesium sulfate particles (C), fatty acid metal salt (D), elastomer (E), and glass fiber (F) in the polycarbonate resin compositions obtained in Examples 1 to 8 and Comparative Examples 1 to 11.

TABLE 1

| | (A) | (B) | (C) | | (D) | (E) | (F) |
|---|---|---|---|---|---|---|---|
| | | | (C-1) | (C-2) | | | |
| Example 1 | 76.0 | 6.2 | 14.4 | | 0.4 | 3.0 | |
| Example 2 | 73.9 | 6.2 | 14.4 | | 0.4 | 9.1 | |
| Example 3 | 77.1 | 6.3 | 14.7 | | 0.4 | 1.5 | |
| Example 4 | 75.3 | 6.3 | 14.6 | | 0.4 | 3.4 | |
| Example 5 | 72.6 | 6.2 | 14.6 | | 0.4 | 6.2 | |
| Example 6 | 68.3 | 6.3 | 14.6 | | 0.4 | 10.4 | |
| Example 7 | 75.3 | 6.3 | | 14.6 | 0.4 | 3.4 | |
| Example 8 | 72.6 | 6.2 | | 14.6 | 0.4 | 6.2 | |
| Comparative Example 1 | 79.0 | 5.9 | 14.7 | | 0.4 | | |
| Comparative Example 2 | 100.0 | | | | | | |
| Comparative Example 3 | 80.0 | | | | | | 20.0 |
| Comparative Example 4 | 80.0 | | 20.0 | | | | |
| Comparative Example 5 | 84.7 | | 14.9 | | 0.4 | | |
| Comparative Example 6 | 79.0 | 6.3 | 14.7 | | | | |
| Comparative Example 7 | 77.0 | 6.3 | | | 0.4 | 1.5 | 14.7 |
| Comparative Example 8 | 75.2 | 6.3 | | | 0.4 | 3.4 | 14.6 |
| Comparative Example 9 | 72.5 | 6.2 | | | 0.4 | 6.2 | 14.6 |
| Comparative Example 10 | 59.2 | 6.3 | | | 0.4 | 10.4 | 14.6 |
| Comparative Example 11 | 79.0 | 5.9 | | 14.7 | 0.4 | | |

Evaluation Method

The polycarbonate resin compositions obtained in examples and comparative examples were extruded into strand-shaped ones and then cut to obtain polycarbonate resin composition pellets. For the polycarbonate resin composition pellets, the melt flow rate was measured by the above method.

In addition, the above polycarbonate resin composition pellets were injection-molded by a small injection molding machine (C.Mobile0813, manufactured by Shinko Sellbic Co., Ltd.) to produce a molded body (length of 50 mm, width of 5 mm, thickness of 2 mm). Using the obtained molded body as a test piece, the impact strength and flexural modulus were measured by the method described above.

Moreover, the appearance of each test piece was visually observed to check whether or not a filler was recognized on the surface. The case where the filler was not recognized was designated as "o", and the case where the filler was recognized was designated as "x".

The obtained results are summarized in Table 2 below together with the above measurement results.

TABLE 2

| | MFR (g/10 min) | Izod (kJ/m$^2$) | FM (Gpa) | Appearance |
|---|---|---|---|---|
| Example 1 | 55.0 | 13.8 | 3.2 | o |
| Example 2 | 36.1 | 26.7 | 3.2 | o |
| Example 3 | 31.3 | 24.6 | 3.5 | o |

TABLE 2-continued

|  | MFR (g/10 min) | Izod (kJ/m$^2$) | FM (Gpa) | Appearance |
|---|---|---|---|---|
| Example 4 | 17.9 | 31.5 | 6.4 | ○ |
| Example 5 | 25.1 | 29.2 | 3.6 | ○ |
| Example 6 | 28.1 | 36.8 | 3.6 | ○ |
| Example 7 | 17.6 | 18.0 | 3.1 | ○ |
| Example 8 | 17.4 | 20.7 | 2.7 | ○ |
| Comparative Example 1 | 58.4 | 3.7 | 4.1 | ○ |
| Comparative Example 2 | 4.5 | 87.7 | 2.2 | ○ |
| Comparative Example 3 | 4.1 | 11.8 | 4.8 | × |
| Comparative Example 7 | 8.2 | 12.9 | 3.9 | × |
| Comparative Example 8 | 9.6 | 12.1 | 4.7 | × |
| Comparative Example 9 | 9.9 | 10.9 | 4.4 | × |
| Comparative Example 10 | 11.6 | 9.0 | 3.8 | × |
| Comparative Example 11 | 27.9 | 9.4 | 3.6 | ○ |

As shown in Table 2 above, the polycarbonate resin compositions (Examples 1 to 8) containing polycarbonate resin, olefin polymer, basic magnesium sulfate, fatty acid metal salt, and elastomer in a predetermined amount have significantly improved values of the melt flow rate as compared with the polycarbonate resin singly (Comparative Example 2) and the polycarbonate resin composition including glass fiber as a filler (Comparative Example 3).

In addition, the impact strength (Izod) of the molded body produced by using the polycarbonate resin compositions in Examples 1 to 8 is significantly larger than that of the molded body produced by using the polycarbonate resin composition containing no elastomer (Comparative Example 1). The molded body with an impact strength of less than 13 kJ/m$^2$ may not be suitable for practical use, although the flexural modulus is about 3.5 GPa. The molded body of the present invention has an impact strength of 13 kJ/m$^2$ or more, and therefore is found to have no problem in practical use.

In addition, the molded body produced by using the polycarbonate resin compositions in Examples 1 to 8 is more excellent in flexural modulus, as compared with the molded body produced by using the polycarbonate resin singly (Comparative Example 2). Moreover, poor appearance does not occur, unlike the molded body produced by using the polycarbonate resin composition including glass fiber as a filler (Comparative Example 3).

The appearance of all of the molded bodies produced by using the polycarbonate resin compositions in Comparative Examples 7 to 10 was confirmed to be poor. The polycarbonate resin compositions in Comparative Examples 7 to 10 have the same compositions as the polycarbonate resin compositions in Examples 3 to 6, respectively, except for containing glass fiber instead of fibrous basic magnesium sulfate. It is shown that containing glass fiber as a filler fails to obtain the polycarbonate resin composition that can be kneaded and molded without hydrolysis, has excellent processability, and can obtain a molded body having good mechanical properties and appearance.

It is found from the comparison between Examples 7 and 8 and Comparative Example 11 that the molded body having a large impact strength (Izod) cannot be obtained when the polycarbonate resin composition containing no elastomer is used although the fan-shaped basic magnesium sulfate particles are contained.

Figure 2:
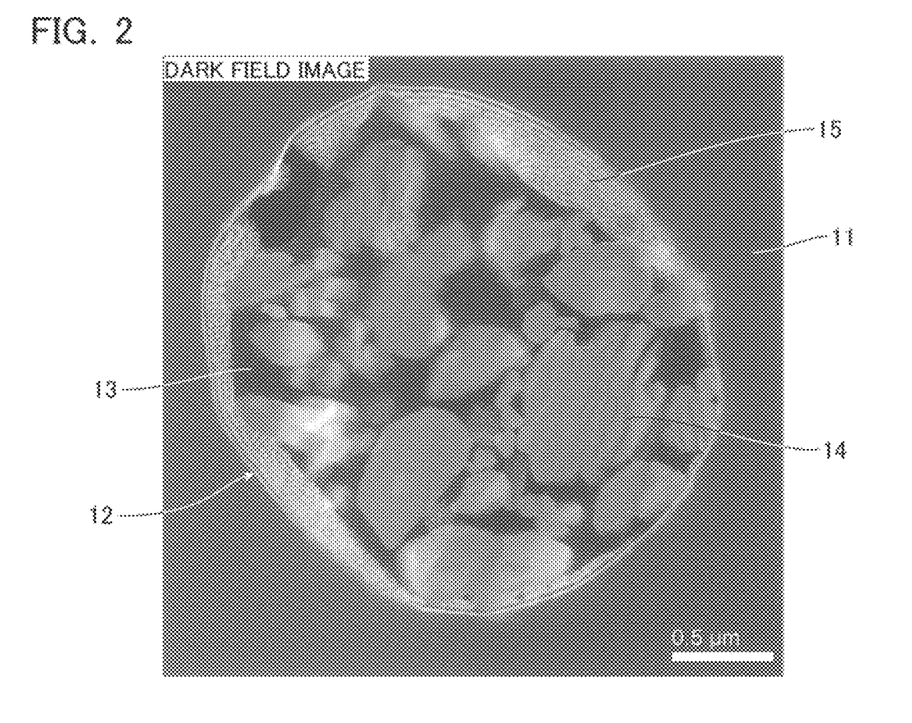
FIG. 2 shows a transmission electron microscope (TEM) photograph of the polycarbonate resin composition according to Example 2.

Herein, FIG. 2 shows a TEM photograph of the polycarbonate resin composition in Example 2. As shown in the figure, island phase 12 surrounded by elastomer 15 is dispersed in sea phase 11 consisting of the polycarbonate resin. It is confirmed that fibrous basic magnesium sulfate 14 is present together with olefin polymer 13 inside island phase 12.

REFERENCE SIGNS LIST

11 Sea phase (polycarbonate resin)
12 Island phase
13 Olefin polymer
14 Fibrous basic magnesium sulfate
15 Elastomer

The invention claimed is:

1. A polycarbonate resin composition, comprising: 50 to 90% by mass of polycarbonate resin (A); 2.0 to 20% by mass of olefin polymer (B); 5 to 40% by mass of basic magnesium sulfate (C) selected from fibrous basic magnesium sulfate (C-1) and fan-shaped basic magnesium sulfate (C-2); 0.1 to 8% by mass of at least one (D) selected from a fatty acid metal salt and a fatty acid; and 1 to 20% by mass of elastomer (E).

2. The polycarbonate resin composition according to claim 1, having a sea-island structure consisting of a sea phase including the polycarbonate resin and an island phase having the elastomer on an outer circumference.

3. A method for producing the polycarbonate resin composition according to claim 1, comprising:
a first step of melt-kneading 2 to 50% by mass of olefin polymer (B), 40 to 70% by mass of basic magnesium sulfate (C) selected from fibrous basic magnesium sulfate (C-1) and fan-shaped basic magnesium sulfate (C-2), 0.1 to 5% by mass of at least one (D) selected from a fatty acid metal salt and a fatty acid, and 1 to 50% by mass of elastomer (E) to obtain masterbatch pellets; and
a second step of melt-kneading the masterbatch pellets and polycarbonate resin (A) to produce the polycarbonate resin composition.

4. A method for producing the polycarbonate resin composition according to claim 1, comprising:
a first step of melt-kneading 28 to 50% by mass of olefin polymer (B), 40 to 70% by mass of basic magnesium sulfate (C) selected from fibrous basic magnesium sulfate (C-1) and fan-shaped basic magnesium sulfate (C-2), and 0.1 to 5% by mass of at least one (D) selected from a fatty acid metal salt and a fatty acid to obtain masterbatch pellets; and
a second step of melt-kneading the masterbatch pellets, polycarbonate resin (A), and elastomer (E) to produce the polycarbonate resin composition.

5. A method for producing the polycarbonate resin composition according to claim 1, the method comprising melt-kneading 50 to 90% by mass of polycarbonate resin (A), 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E).

6. A method for producing the polycarbonate resin composition according to claim 1, the method comprising:
melt-kneading 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E); and then adding and melt-kneading 50 to 90% by mass of polycarbonate resin (A).

7. A polycarbonate resin composition, comprising:
   masterbatch pellets obtained by kneading 2 to 50% by mass of olefin polymer (B), 40 to 70% by mass of basic magnesium sulfate (C) selected from fibrous basic magnesium sulfate (C-1) and fan-shaped basic magnesium sulfate (C-2), 0.1 to 5% by mass of at least one (D) selected from a fatty acid metal salt and a fatty acid, and 1 to 50% by mass of elastomer (E); and
   diluent including polycarbonate.

8. A molded body, being a molded product of the polycarbonate resin composition according to claim 1.

9. A method for producing the polycarbonate resin composition according to claim 2, comprising:
   a first step of melt-kneading 2 to 50% by mass of olefin polymer (B), 40 to 70% by mass of basic magnesium sulfate (C) selected from fibrous basic magnesium sulfate (C-1) and fan-shaped basic magnesium sulfate (C-2), 0.1 to 5% by mass of at least one (D) selected from a fatty acid metal salt and a fatty acid, and 1 to 50% by mass of elastomer (E) to obtain masterbatch pellets; and
   a second step of melt-kneading the masterbatch pellets and polycarbonate resin (A) to produce the polycarbonate resin composition.

10. A method for producing the polycarbonate resin composition according to claim 2, comprising:
    a first step of melt-kneading 28 to 50% by mass of olefin polymer (B), 40 to 70% by mass of basic magnesium sulfate (C) selected from fibrous basic magnesium sulfate (C-1) and fan-shaped basic magnesium sulfate (C-2), and 0.1 to 5% by mass of at least one (D) selected from a fatty acid metal salt and a fatty acid to obtain masterbatch pellets; and
    a second step of melt-kneading the masterbatch pellets, polycarbonate resin (A), and elastomer (E) to produce the polycarbonate resin composition.

11. A method for producing the polycarbonate resin composition according to claim 2, the method comprising melt-kneading 50 to 90% by mass of polycarbonate resin (A), 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E).

12. A method for producing the polycarbonate resin composition according to claim 2, the method comprising:
    melt-kneading 2.0 to 20% by mass of olefin polymer (B), 5 to 40% by mass of basic magnesium sulfate (C) selected from fibrous basic magnesium sulfate (C-1) and fan-shaped basic magnesium sulfate (C-2), 0.1 to 8% by mass of at least one (D) selected from a fatty acid metal salt and a fatty acid, and 1 to 20% by mass of elastomer (E); and then
    adding and melt-kneading 50 to 90% by mass of polycarbonate resin (A).

\* \* \* \* \*